United States Patent [19]

Appriou

[11] Patent Number: 5,537,118
[45] Date of Patent: Jul. 16, 1996

[54] METHOD FOR TRACKING MOVING OBJECTS

[75] Inventor: Alain Appriou, Orsay, France

[73] Assignee: Office National D'Etudes Et De Recherches Aerospatiales, Chatillon Cedex, France

[21] Appl. No.: 412,200

[22] Filed: Mar. 28, 1995

[30] Foreign Application Priority Data

Mar. 30, 1994 [FR] France .................. 94 03795

[51] Int. Cl.⁶ ............................................ G01S 13/66
[52] U.S. Cl. .......................................................... 342/95
[58] Field of Search ........................... 342/95, 90, 96, 342/97; 367/95, 97; 364/516, 517

[56] References Cited

U.S. PATENT DOCUMENTS 5,392,225 2/1995 Ward .................................. 364/516

OTHER PUBLICATIONS

IEEE TAES, vol. 29, No. 2, Apr. 1993, NEW YORK, NY, USA; pp. 352–363; B. ZHOU ET N. K. BOSE "Multitarget tracking in clutter: fast algorithms for data association".
ICASSP 91 S2 VSLI U, vol. 2, 14 Mai 1991, THE SHERATON CENTRE HOTEL & TOWERS, TORONTO, ONTARIO, CANADA; pp. 1437–1440 SERGE PROSPERI "New passive tracking algorithms using power information with application to passive sonar".

IEEE TAES, vol. 29, No. 4, Sep. 1993, NEW YORK, NY, USA, pp. 1275–1286; JEAN DEZERT ET YAAKOV BAR SHALOM "Joint probabilistic data association for autonomous navigation".

*Primary Examiner*—Daniel T. Pihulic
*Attorney, Agent, or Firm*—Christie, Parker & Hale

[57] ABSTRACT

The tracking of moving objects on land, in the air or at sea is effected by means of one or more sensors ($S_j^1$). The observation space of each sensor is divided into resolution cells ($X^{1h}$) forming a grid. The sensors of the same grid are grouped together.

A probability estimate ($\beta k$) for a moving object being in a cell ($Xk$) which is an intersection of the resolution cells ($X^{1h}$) is produced. For this purpose, the starting points are signals ($M_j^{1h}$) delivered by the sensors ($S_j^1$) and previously selected according to windowing criteria, sets of pairs ($F_i(M_j^{1h})D_{ij}^{1h}$) stored in memories (1) and coming from a prior supervised statistical learning, and tracking coefficients ($\alpha k$) delivered by an adaptive tracking filter (4) of the PDAF type. After application of this probability ($\beta k$) to the adaptive tracking filter (4), there is obtained on the one hand an estimated status ($X^*,P^*$) affording a trajectory prediction (x,S) for at least one moving object and, on the other hand, the windowing criterion is adjusted.

30 Claims, 3 Drawing Sheets

1

METHOD FOR TRACKING MOVING OBJECTS

BACKGROUND OF THE INVENTION

The present invention concerns the tracking of moving objects on land, in the air or at sea in a space observed by one or more sensors.

The sensors may be of the radar, radiometer, imager, or sonar type. A sensor divides the observed space in a grid which is peculiar to it and which, in the case of radar, is a three-dimensional grid enabling the position of the moving object to be defined with respect to elevation angle, azimuth and distance within resolution cells.

The known tracking methods use detection, filtering and optionally classification functions.

For each sensor, and at the time of each observation, the detection function allocates the presence of the moving object being tracked to a resolution cell of the grid, referred to as the "pip". This allocation, established in accordance with predefined criteria, for example, in the case of radar the level of the signal reflected by the moving object, makes it possible to reduce the number of items of information to be processed.

The filtering function associates the pips detected during successive observations. The association of these successive pips constitutes a "track". Amongst the most widely known filtering functions can be cited those using the Kalman-type filter for tracking limited to one moving object, or variants more suitable for an operational context with high densities of moving objects such as, for example, the one using the probabilistic data association filter (PDAF).

The classification function can make it possible to track solely one moving object of known identity from among a set of moving objects previously characterised during a learning stage.

It may be advantageous to use several sensors in conjunction. The matching of measurements coming from different sensors is then envisaged before or after filtering, which is referred to respectively either as the "merging of pips" or the "merging of tracks". The technique used generally consists, for each sensor, of taking local decisions concerning the allocation of a moving object to a resolution cell, which gives an estimation of pips, peculiar to each sensor, filtering the pips thus estimated in order to form tracks, and then merging either the selected pips or the different tracks.

However, taking successive local decisions entails a loss of information at each level of processing of the measurements, which is prejudicial to the reliability of the final decision, coming from the merging of all the intermediate decisions.

SUMMARY OF THE INVENTION

The purpose of the invention is to improve the available performance with regard to the tracking of moving objects, particularly in cases of high density of moving objects in the observed space and/or the use of a large number of sensors of different types.

Very generally, in this new method, the detection function is eliminated, making it possible to take a centralised final decision integrating all the information coming from the different sensors. The sensors are organised in groups, each sensor in the same group having the same grid.

The method according to the invention includes the following steps:

a) one or more sensors are provided, which deliver signals relating to the presence of at least one moving object, with reference to a known division of space, peculiar to each group of sensors, in so-called spatial resolution cells ($X^{1h}$), where the index 1 indicates belonging to a group of sensors, referred to as the alignment group, and the index h represents the number of the said cell among the p permitted by the division of the observation space common to the sensors in group 1;

b) by means of logic tests peculiar to each sensor, some of these signals are selected in accordance with a chosen windowing criterion, relating to the resolution cells;

c) an estimate is worked out of the probability that a moving body has of being in a cell which is the intersection of the resolution cells peculiar to each sensor, according to the signals selected at b), and trajectory tracking data;

d) this probability is applied to an adaptive tracking filter, the output of this filter supplying an estimated status and affording a trajectory prediction for at least one moving object; and e) the chosen windowing criterion is adjusted according to this trajectory prediction.

According to one aspect of the invention, step c) comprises:

c1) the prior storage in memory of n sets of J distribution functions $F_1(M_j^{1h})$, these n sets relating respectively to n identities $H_i$ of moving objects indexed (i=1 to n; j=1 to J; J representing the number of sensors in an alignment group), each of these functions $F_i(M^j_1h)$ representing the a priori probability $P(M_j^{1h}/H_i)$ of observing the measurement $Mj^{2h}$ in the resolution cell $X^{1h}$ of the sensor $S_j^1$ when a moving object of identity $H_i$ is presented to the sensor, and having a coefficient $D_{ij}^{1h}$ representing the degree of confidence given thereto;

c2) the determination, from each measurement $M_j^{1h}$ and the pairs $(F_i(M_j^{1h}), D_{ij}^{1h})$ stored in memories of orders of likelihood $A_{ij}^{1h}$, $B_{ij}^{1h}$, and this for all the identities of indexed moving objects $H_i$, where $A_{ij}^{1h}$ represents the likelihood ratio between the cases "there is a moving object of identity $H_i$ in cell $X^{1h}$" and "no moving object of identity $H_i$ is present in the cell $X^{1h}$", while $B_{ij}^{1h}$ represents an uncertainty factor for $A_{ij}^{1h}$;

c3) the merging, for each resolution cell $X^{1h}$ and each identity of moving objects $H_i$, of these pairs of orders of likelihood $(A_{ij}^{1h}, B_{ij}^{1h})$ obtained for all the sensors $(S_j^1)$ in the same alignment group, into a single pair of likelihood $(A_i^{1h}, B_i^{1h})$;

c4) the calculation, from the likelihoods $(A_1^{1h}, B_1^{1h})$ relating to a first resolution cell $X^{1h}$, of the likelihood $Q^{1h}$ for there being in this cell $X^{1h}$ a moving object of the same identity as the moving object being tracked;

c5) the calculation, from the likelihoods $Q^{1h}$ of each group of sensors, for each cell Xk, the intersection of the resolution cells $X^{1h}$ in question, of the likelihood Qk of there being in this cell Xk a moving object of the same identity as the moving object being tracked; and c6) the calculation, from the values Qk and tracking coefficients αk delivered by the adaptive tracking filter, for each cell Xk, of the a posteriori probability BK that the moving body being tracked is in this cell Xk.

In one particularly advantageous embodiment, said steps a) to c) comprise the taking into account of several sets of function signals and of parameter signals representing the different and particular environment conditions, and this selectively at each sensor ($S_j^1$).

According to an important characteristic of the invention, the distribution functions $F_i(M_j^{1h})$ and the confidence coefficients which are associated with them $D_{ij}^{1h}$ result from a prior supervised statistical learning. In addition, the n times J pairs ($F_i(M_j^{1h})$, $D_{ij}^{1h}$) can correspond to particular observation conditions according to the weather, the time, the seasons, the observation geometry, the type of environment and the physical characterisation of the targets.

As a result, a set of n times m pairs ($F_i(M_j^{1h})$, $D_{ij}^{1h}$) is associated with each particular observation condition, each set being stored in memories peculiar to one, and only one, particular observation condition.

Other preferred characteristics and advantages of the invention will emerge from an examination of the following detailed description, and the accompanying drawings, taken in conjunction with the claims.

DETAILED DESCRIPTION OF THE PREFERRED EMBODIMENT

Figure 1:
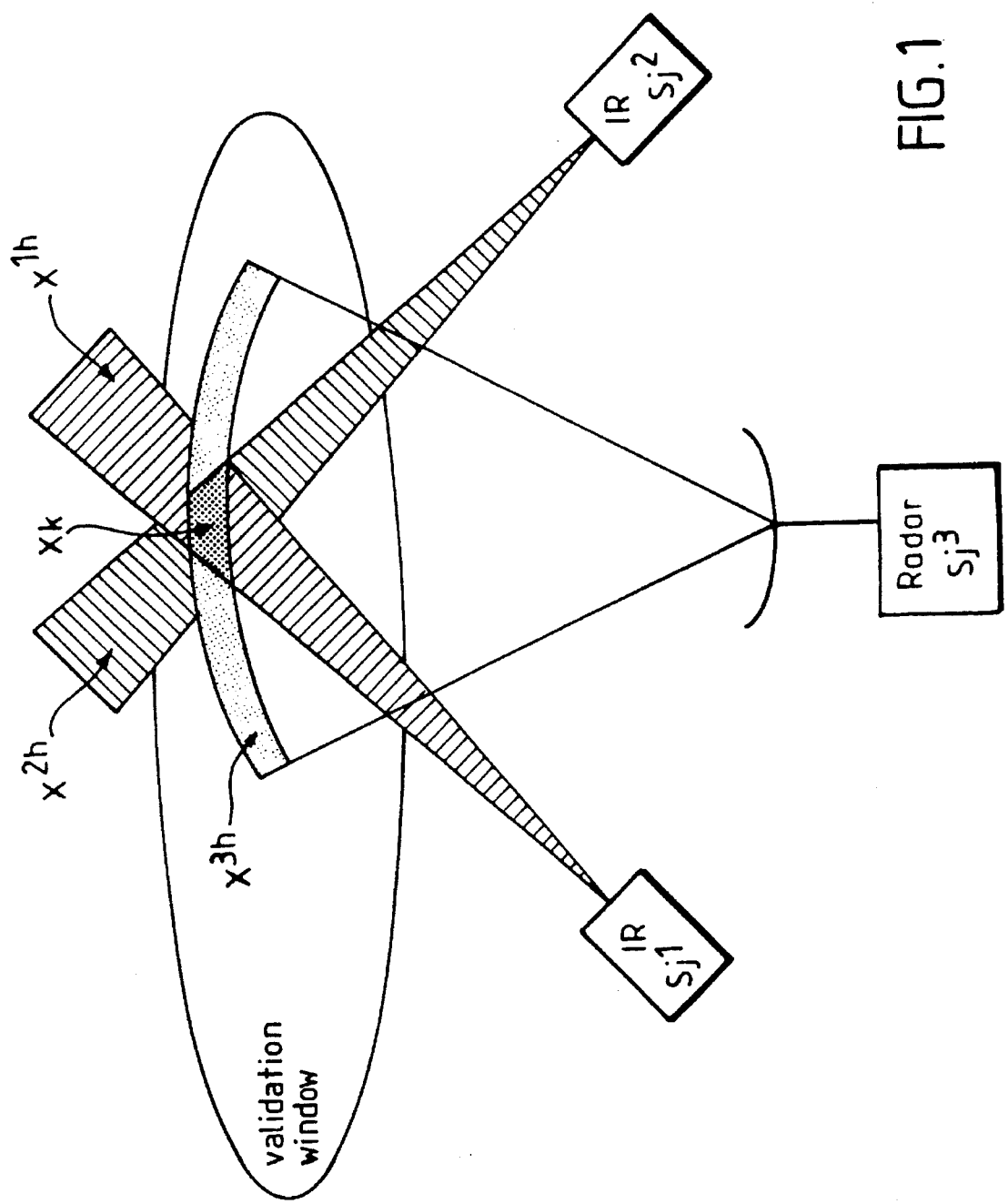
FIG. 1 illustrates the observation geometry of a measurement acquisition device, according to the invention, restricted to three sensors, and projected onto a horizontal plane.

The accompanying drawings are, for the main part, certain in character. Consequently they form an integral part of the description and can not only serve to supplement it but also contribute to its definition, where applicable.

In some known methods, the filtering function comes from a Kalman filter, which filters kinematic measurements made at successive instants on a moving object. This filter requires unambiguous tracking, at every instant, of a single moving object, since it requires one and only one innovation at each readjustment of the estimate of the said moving object, which innovation represents the difference between the status measured and the status predicted by the filter.

In order to be able to analyse these more realistic cases (numerous moving objects, nondetection false detection due to noise, to the environment or to countermeasure, etc.), a certain number of arrangements have been envisaged by experts in order to attempt to improve the performance of the Kalman filter. In the context which concerns this invention, the most interesting arrangement is the probabilistic data association one, referred to as "PDAF", described in the work:

Y. BAR-SHALOM: "Multi Target Multi Sensor Tracking", Volume 2, Applications and Advances, Artech House, Norwood, Chapter 9, 1992.

In practice, what differentiates the PDAF filter from the Kalman filter is mainly the step of updating the estimate (status predicted by the prediction step) when each new measurement is taken into account. In order to perform this updating, the PDAF filter proceeds in two steps:

it performs a statistical windowing, selecting the pips which are in the vicinity of the estimate provided by the prediction step, such that the probability of the moving object being in this vicinity is greater than a given threshold, and it calculates the innovation necessary for the updating, which is determined by linear combination of the innovations calculated for each pip selected by the first step; the weighting coefficients for the linear combination being the probabilities which each of these pips has, a priori, of actually being the moving object being tracked, having regard to the probabilities of detection and false alarm of each sensor used, the position predicted by the prediction module, and the statistical windowing threshold used in the first step.

In spite of these improvements, the PDAF filter has a certain number of limitations for the problem of moving object trajectory tracking, limitations which are more or less detrimental depending on the applications of the filter:

it effects a merging in time and space of decentralised decisions with regard to the presence or absence of a moving object at a given time and place; as a result there is a loss of information and therefore of performance compared with a method which would allow centralised merging of all the discriminating measurements delivered by the different sensors; this is detrimental to the tracking of one moving object among other moving objects which are close in space and of different identities;

it requires the choice of an optimum detection threshold, and a knowledge of the probabilities of detection and false alarm which result therefrom;

it does not make it possible, because of the structure of the processing used, to assess the quality of the track selected in real time, in terms of the likelihood of a moving object of known identity actually being in the validation window at each instant;

it absolutely does not make it possible, when there are a number of moving objects of different identities in the validation window, to use the probabilistic likelihood of hypotheses of classification of the signal within the filter, to ensure the tracking of a given moving object; and it does not make it possible to resolve the problems of association of measurements coming from certain disparate sensor types, without having recourse either to a nonlinear filter, which is often unstable, or to the synthesis of pseudo 3D measurements by triangulation, which may generate phantom moving objects (false associations of pips).

In order to increase the performance of the PDAF-type filter, the Applicant developed the present method of tracking the trajectory of moving objects, and integrated the said PDAF filter in the device described below.

Figure 2:
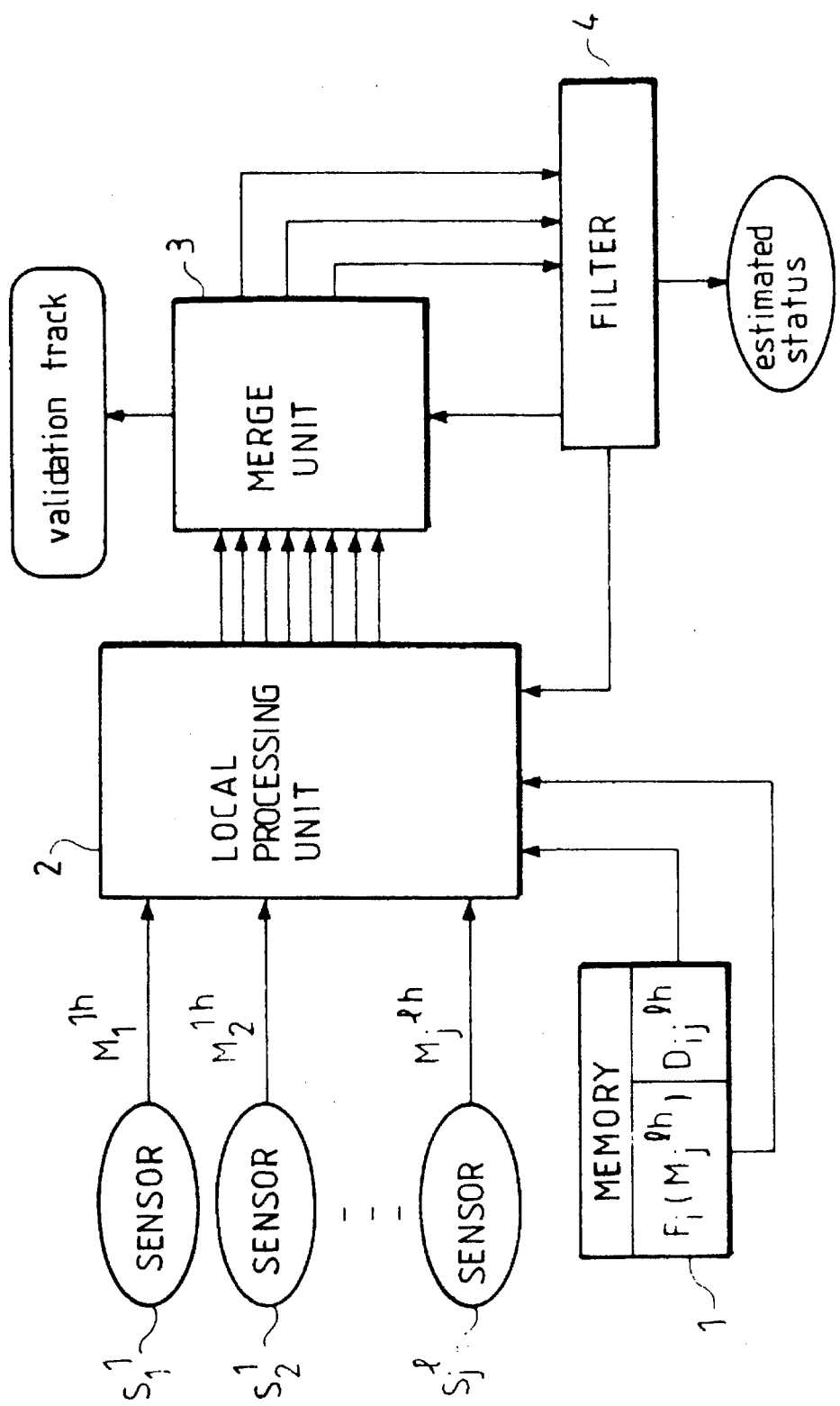
FIG. 2 is a highly simplified diagrammatic representation of the general operating principle of the device according to the invention.
Figure 3:
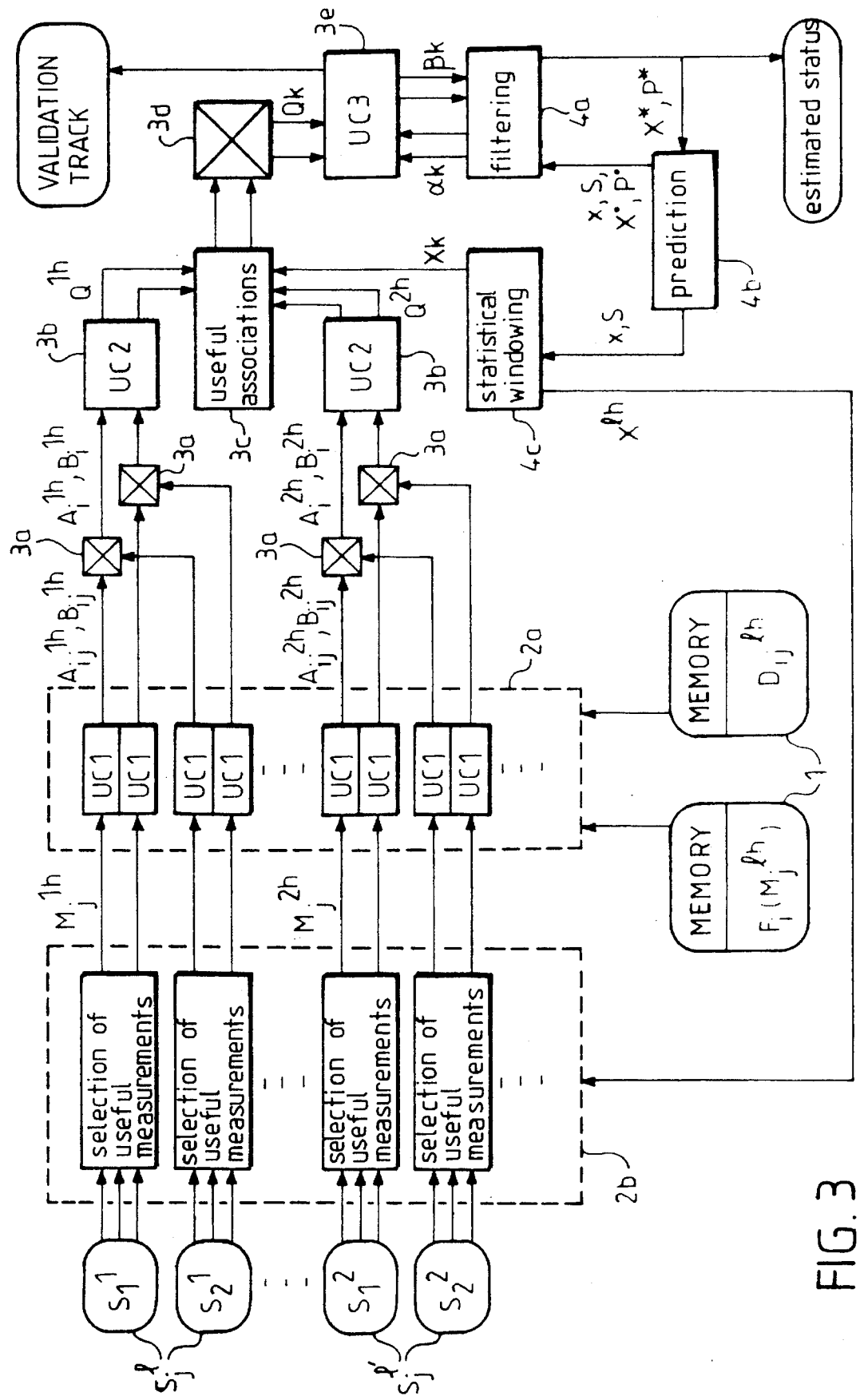
FIG. 3 is a more detailed diagrammatic representation of the device according to the invention.

To illustrate this device, reference is now made to FIGS. 2 and 3.

It is necessary first of all to explain the terminology used.

two sensors are said to be aligned if they provide divisions of their inherent observation space into identical spatial resolution cell $X^{1h}$ on the validation window; thus the sensors $S_j^1$ and $S_{j'}^{1'}$ will be aligned if their respective indices 1 and 1' are identical (1 is the index of the sensor alignment group) and if j is different from j' (j is the index of the sensor in its alignment group); and two sensors are said to be "nonaligned" in the contrary case, such as for example two sensors of different natures or with resolution cells which are not strictly identical; thus two sensors $S_j^1$ and $S_{j'}^{1'}$ will be said to be nonaligned if their respective indices 1 and 1' are different, whatever j and j'.

In the remainder of the description, the aligned sensors in the same group of index 1 will by convention be termed $S_j^1$ and the aligned sensors in another group of index 1' will be termed $S_{j'}^{1'}$.

In addition, the space is divided into spatial resolution cells $X^{1h}$, where the index 1 indicates belonging to a group of sensors referred to as an alignment group, and the index h represents the number of the said cell among the p permitted by the division of the observation space common to the sensors in group 1.

As illustrated in FIG. 1, Xk refers to the resolution cells obtained by intersection of the resolution cells $X^{1h}$ of the set of all the sensors belonging to alignment groups of different indices 1. In this FIG. 1, two nonaligned infrared sensors ($S_j^1$, $S_j^2$) are depicted, and a radar ($S_j^3$), as well as their respective resolution cells $X^{1h}$, $X^{2h}$ and $X^{3h}$. Xk represents the intersection of these three cells.

The device according to the invention comprises three distinct and interconnected parts. Their description is given below:

1) The first part comprises any number of sensors $S_j^1$, aligned or otherwise, localised or otherwise, and which may differ in their nature and their location capacity (spatial resolution of the measurement). Each sensor $S_j^1$ supplies a measurement $M_j^{1h}$ or a set of measurements which are discriminant with regard to the identity of the object observed, and for each of its accessible resolution cells $X^{1h}$.

2) The second part comprises memories 1, which contain the distribution functions $F_i(M_j^{1h})$ representing each a priori probability $P(M_j^{1h}/H_i)$ of observing the measurement $M_j^{1h}$ if a moving object of identity $H_i$ were in the resolution cell $X^{1h}$ of the sensor $S_j^1$; these functions are obtained by prior learning, statistical and supervised, of the distribution histograms for the possible values of $M_j^{1h}$ for the different identities of indexed moving objects $H_i$. The memories 1 also contain the confidence coefficients $D_{ij}^{1h}$ associated with each distribution function $F_i(M_j^{1h})$. Each confidence coefficient characterises the more or less good representativeness of the associated distribution function, having regard to the possible range of change of the observation conditions; the coefficients $D_{ij}^{1h}$ are learned under supervision in order to optimise the performance of the method; the optimisation procedure is specific to each application (sensors, purpose of the method, operational conditions). Each memory 1 contains n times J pairs $(F_i(M_j^{1h}), D_{ij}^{1h})$, corresponding to one and only one particular observation condition.

The learning of the pairs $(F_i(M_j^{1h}), D_{ij}^{1h})$ and their storage in memory may use any device known to experts, who have full knowledge of how to master this type of operation.

3) The third part comprises a unit 2 for the local processing of each measurement $M_j^{1h}$, to evaluate, by means of the pairs $(F_i(M_j^{1h}), D_{ij}^{1h})$ contained in the memories 1, the likelihood of there being a moving object of given identity in the resolution cell $X^{1h}$ of the sensor $S_j^1$, and this for all identities indexed a priori $H_i$ for the memories 1.

4) The fourth part comprises a unit 3 for merging the likelihoods delivered by the local processing unit 2, for producing a location likelihood for the target being tracked, on the basis of all the observations made at the current time. This likelihood is calculated for each resolution cell Xk situated within a tracking window defined by a filter 4 in accordance with the so-called PDAF statistical windowing technique. In addition, this merge unit 3 immediately supplies a criterion for validating or invalidating the track being processed, assessing from the measurements the likelihood of a moving object of correct identity actually being within the tracking window.

5) The fifth part comprises the tracking filter 4, which is an adaptation of the so-called PDAF technique for n optimised taking into account of the information produced by the above-mentioned units 2 and 3. Experts know that a filter of the PDAF type consists of three modules: a prediction module 4b, a statistical windowing module 4c and a filter updating module 4a. The method according to the invention uses the prediction 4b and statistical windowing 4c modules in a conventional manner, the said statistical windowing module 4c allowing the use of a logic for selecting the resolution cell $X^{1h}$ to be processed. On the other hand, the filter updating module 4a corresponds to a mode of functioning of the PDAF in which a minimum threshold would be chosen which would adopt, without selection, all the cells of the validation window, which amounts to imposing a detection probability equal to the false alarm probability, equal to 1. The single innovation necessary for filters of the Kalman type is then given by the linear combination of the innovations calculated for each of the resolution cells $X^{1h}$ within the tracking window, without discrimination. The weighting given to each of these innovations in the linear combination, representing the probability which each of them has of actually corresponding to the moving object being tracked, is then determined, on the one hand from the weighting conventionally used by the PDAF where the detection probability is made to be equal to 1, and on the other hand from likelihoods of location of the moving object being tracked, produced by the above-mentioned merge unit 3. This filter 4 makes it possible to calculate the estimated status of the moving object which is the subject of the trajectory monitoring.

To these different components an additional calculation unit (not shown) can be added, carrying out the identification of the observation conditions, from the measurements $M_j^{1h}$ and external information, then making it possible to select the memories containing the n times J pairs $(F_i(M_j^{1h}), D_{ij}^{1h})$ which are the most suitable.

Finally, the addition of a logic unit (not shown) to these different components can make it possible to establish an initial threshold of certain measurements $M_j^{1h}$, in order to limit the number of resolution cells to be processed, by eliminating those for which the signal observed straightaway affords the quasi-certainty that they do not contain the moving object; this may make it possible to limit the amount of processing to be carried out without for all that, significantly degrading the performance of the system.

The local processing unit 2, the merge unit 3 and the tracking filter 4 will now be described in detail in order to show the originality of the present invention.

a) The local processing unit 2 comprises a first logic unit 2b which implements logic tests, suited to the nature of each sensor $S_j^1$, aimed at selecting the measurements $M_j^{1h}$ which are associated with the resolution cells $X^{1h}$ of nonvacant intersection with the validation window supplied by the tracking filter 4. The first logic unit 2b is connected to a first calculation unit 2a, which puts in parallel primary calculation units UC1 suitable for processing, at a given instant, one and only one measurement coming from a given sensor $S_j^1$. These calculation units UC1 fulfil a dual role:

a1) they afford the selection, in the memory 1, of the value $F_i$ corresponding to the measurement $M_j^{1h}$ selected, for identified observation conditions. The value $F_i(M_j^{1h})$ supplied therefore represents the a priori probability $P(M_j^{1h}/H_i)$ of observing the measurement $M_j^{1h}$ actually read, if a moving object of identity $H_i$ is in the resolution cell $X^{1h}$ of the sensor $S_j^1$.

a2) they provide the true local processing step by producing, from each measurement $M_j^{1h}$ and the pairs $(F_i(M_j^{1h}), D_{ij}^{1h})$ selected, the likelihood of a moving object of identity $H_i$ being in the cell $X^{1h}$, and this for all the identities $H_i$ indexed a priori. This likelihood is expressed by a pair of values $(A_{ij}^{1h}, B_{ij}^{1h})$ in which:

$A_{ij}^{1h}$ represents a likelihood ratio between the case: "there is a moving object of identity $H_i$ in the cell $X^{1h}$", and the contrary case: "there is no moving object of identity $H_i$ in the resolution cell $X^{1h}$"; and $B_{ij}^{1h}$ is an uncertainty factor for $A_{ij}^{1h}$.

These values are preferably calculated by means of expressions whose theoretical optimality has been established on the basis of the theory of evidence devised by Dempster and Shafer, described in the work:

G. Shafer: "Mathematical Theory of Evidence", Princeton University Press, 1976.

The work thus carried out made it possible to formalise the processing which was necessary to apply to the pairs $(F_i(M_j^{1h}), D_{ij}^{1h})$ for producing the information most suited to a filtering function. In order to calculate these values $A_{ij}^{1h}$ and $B_{ij}^{1h}$, the following alternative can then be envisaged:

Case 1:

$$A_{ij}^{1h} = [1 - D_{ij}^{1h} + R_j^{1h} * F_i(M_j^{1h})] / C_{ij}^{1h}$$

$$B_{ij}^{1h} = (1 - D_{ij}^{1h}) * [1 + R_j^{1h} * F_1(M_j^{1h})] / C_{ij}^{1h}$$

with:

$$C_{ij}^{1h} = 1 + (1 - D_{ij}^{1h}) * R_j^{1h} * F_i(M_j^{1h})$$

$R_j^{1h}$=any normalisation gain, common to all the conjectured identities, simply constrained by:

$$0 < R_j^{1h} < \{\max [F_i(M_j^{1h})]\}^{-1}$$

Case 2:

$$A_{ij}^{1h} = B_{ij}^{1h} = 1 - D_{ij}^{1h} + D_{ij}^{1h} * R_j^{1h} * F_i(M_j^{1h})$$

where the gain $R_j^{1h}$ is defined as for case 1. The pairs of values $(A_{ij}^{1h}, B_{ij}^{1h})$ coming from each calculation unit UC1 are then processed by the merge unit 3 described below.

b) The merge unit 3 of FIG. 2 comprises the five groups of elements described below.

b1) A group of first multipliers 3a effects the merge between the aligned sensors $S_j^1$. For each common resolution cell $X^{1h}$, they merge the likelihoods $(A_{ij}^{1h}, B_{ij}^{1h})$, supplied by the different secondary calculation units UC1 peculiar to each of these sensors $S_j^1$, into a single likelihood $(A_i^{1h}, B_i^{1h})$ strictly of the same type. To do this, the multipliers 3a produce the products:

$$A_i^{1h} = \prod_j A_{ij}^{1h}, \text{ and}$$

$$B_i^{1h} = \prod_j B_{ij}^{1h},$$

which will then be processed by secondary calculation units 3b as described below.

b2) The secondary calculation units 3b, peculiar to each group of aligned sensors $S_j^1$, produce, from the likelihoods $(A_i^{1h}, B_i^{1h})$ delivered by the different multipliers 3a of this group of sensors $S_j^1$, and relating to the same resolution cell $X^{1h}$, the likelihood $Q^{1h}$ of there being, in this resolution cell $X^{1h}$, a moving body of the same identity as the moving being tracked; each secondary calculation unit 3b calculates $Q^{1h}$ in this way for each resolution cell selected by the first logic unit 2b, that is to say with nonvacant intersection with the validation window. The number of conjectured identities $H_i$ indexed is n, and by notation convention the identity tracked is $H_n$. The calculations preferably used, optimised on the basis of the theory of evidence, here result in distinguishing two cases for the calculation of $Q^{1h}$:

either $X^{1h}$ is entirely included within the validation window; and then the corresponding likelihood $Q^{1h}$ is given by:

$$Q^{1h} = A \, n^{1h} / \left[ 1 - \prod_{i \in [1;n-1]} (1 - B_i^{ih}) + \sum_{i \in [1;n-1]} (A_i^{1h} - B_i^{1h}) \right]$$

or $X^{1h}$ is only partially included in the validation window; and then the corresponding likelihood $Q^{1h}$ is given by:

$$Q^{1h} = A \, n^{1h} / [1 - \Pi(1 - B_i^{1h}) + \Sigma(A_i^{1h} - B_i^{1h})]$$

The likelihoods calculated in this way are then processed by a second logic unit 3c described below.

b3) The second logic unit 3c determines, by means of logic tests suited to the nature of the sensors in question $S_j^1$, the associations of resolution cells $X^{1h}$, between the groups of aligned sensors, whose intersection Xk is within the validation window. The associations of cells $X^{1h}$ will then be used for a second multiplier 3d described below.

b4) The second multiplier 3d starts from the different likelihoods $Q^{1h}$ which each group of aligned sensors allocates to the various particular resolution cells $X^{1h}$, and determines a likelihood Qk, strictly of the same type, relating to a resolution cell Xk which is the intersection of the ones $X^{1h}$ in question. This determination is effected for all the associations of resolution cells $X^{1h}$ adopted by the logic unit 3c, and the intersections Xk which are contained in the validation window determined by a statistical windowing module 4c.

For this purpose the multiplier 3d produces the products:

$$Qk = \prod_1 Q^{1h},$$

which are used for a third calculation unit 3e, described below.

b5) The third calculation unit 3e then supplies, for each resolution cell Xk processed, a quantity βk representing the a posteriori probability that the moving object being tracked has of being in this cell Xk; this third calculation unit 3e also supplies a probability β0 that the moving object has of being outside the validation window. Each βk (including β0) is determined from: on the one hand all the likelihoods Qk delivered by the second multiplier 3d and on the other hand from all the coefficients αk traditionally used by the PDAF, here used as if it were functioning with the following condition:

probability of detection=probability of false alarm=1

The coefficients αk, used by this calculation unit 3e, are supplied by the filtering module 4a (of below). The third calculation unit 3e therefore uses the following calculations in order to determine the βk values:

$$\beta 0 = \alpha 0 / \left[ \alpha 0 + \sum_{k \neq 0} (Qk * \alpha k) \right];$$

$$\beta k = Qk * \alpha k / \left[ \alpha 0 + \sum_{k \neq 0} (Qk * \alpha k) \right];$$

This calculation unit 3e makes it possible to validate or invalidate the track processed by a simple logic test on the βk values. Three options then make it possible to validate the track:

if β0 is less than a given threshold, if the maximum βk over all the Xk values is greater than a given threshold, for any combination of the above two tests.

Furnished with the βk probabilities, the tracking filter 4, described below, can then begin its work.

c) The tracking filter 4 of FIG. 2 comprises three interconnected modules, which use the PDAF techniques.

c1) The filtering module 4a determines the tracking coefficients αk required for calculation of the probabilities βk, which are calculated by the third central unit 3e, and supplies an estimated status X* and its covariance P* after updating of the filter 4.

c1-a) The coefficients αk are calculated by requiring the probability of detection to be equal to 1, and are given by:

$$\alpha 0 = N*(2 \, \Pi/\gamma)^{m/2}*(1-Pg)/Cm$$

$$\alpha k = \exp[-0.5*(xk-x)^T*S^{-1}*(xk-x)]$$

where:

$$Cm = \Pi^{m/2}/\Gamma(1+m/2)$$

Γ is the gamma function well known in mathematics m=dimension of x at Xk,

Pg=a priori probability of the moving object being in the validation window, predefined by a threshold, γ, of the windowing module 4c (cf below).

xk=position of the resolution cell Xk,

N=number of resolution cells Xk in the validation window, x,S=predicted position measurement and its covariance, supplied by the prediction module 4b (cf below).

c1-b) The updating of the status of the filter 4 is calculated as follows:

$$X^* = X^0 + G*z$$

$$P^* = \beta 0 * P^0 + (1-\beta 0)*(1-G*H)*P^0 + P'$$

where:

$$P' = G * \left[ \sum_{k \neq 0} \beta k * zk * zk^T \right) - z*z^T \right] * G^T$$

The exponent T represents transpose of the matrix concerned.

$$zk = xk - x$$

$$z = \sum_{k \neq 0} (\beta k * zk) \quad (= \text{innovation of the filter 4})$$

$$G = P^0 * H^T * S^{-1} \quad (= \text{gain of the filter 4})$$

X* P*=estimated status and its covariance, after updating of the filter 4, $X^0$, $P^0$=predicted status and its covariance, supplied by the prediction module 4b (cf below), H=observation matrix of the tracking (x=H * X) where x is the measurement of the position and X the status of the filter 4), x, S=position measurement described and its covariance, supplied by the prediction module 4b (cf below).

The estimated status (X*, P*) is then used by a prediction module as described below.

c2) The prediction module 4b determines the predicted status $X^0$ and its covariance $P^0$, required for the updating of the filtering module 4a, from the status (X*, P*) estimated at the previous instant by the said filtering module 4a, and a predicted position measurement x and its covariance S, required both for the filtering module 4a and the statistical windowing module 4c. The quantities calculated by the prediction module 4b are given below:

$$X^0 = F*X*$$

$$P^0 = F*P**F^T + Q$$

where:

F=transition matrix of the status from one observation instant to the following instant:

Q=noise covariance matrix on the status. And $$x = H*X^0$$

$$S = H*P^0*H^T + R$$

where R is the noise covariance matrix on the measurement, and H the observation matrix.

Finally, the predicted position (x, S) is used for the statistical windowing module k, described below.

c3) The statistical windowing module 4c selects, from the position (x, S) predicted by the prediction module 4b, resolution cells Xk of the space to be processed, which determine a validation window. This module directs the test used by the first logic unit 2b and the second logic unit 3c.

The said selection of the positions Xk is provided by the following logic test:

$$(xk-x)^T*S^{-1}*(xk-x) \geq \gamma$$

where:

x,S=predicted position measurement and its covariance, supplied by the prediction module 4b, γ=predetermined threshold for satisfying a given a priori probability Pg of the target which is being tracked within the validation window.

The method according to the invention has, compared with the state of the art, a certain number of functional advantages which makes it possible to improve the available performance (tracking precision, extraction/validity/management of the tracks, target recognition rate) and the manageable configurations (types and associations of sensors, observation geometries, environment densities). The main advantages offered by the method are set out below:

- a centralised space/time/sensor merging of the evaluations, without any loss of information (no decision making or quantification at any level whatsoever);
- use of the classification of the moving objects upstream of the signal, and direct integration of the corresponding evaluations within the tracking filter. This makes it possible in particular to manage arrays of filters adapted to different moving object identities. The classification thus makes it possible to improve the tracking, and vice versa;
- pertinent management of the uncertain: the lack of control of the tracking filters of the PDAF type, with regard to choice of the detection threshold and evaluation of the detection probability, is in this case transferred to any lack of representativeness of the learning of the distribution functions $F_i(M_j^{1h})$, and controlled to the best possible extent by the learning of the confidence coefficients $D_{ij}^{1h}$ and suitable processing of the uncertain based on the theory of evidence;
- the evaluation, from the measurements, of a validity criterion for the processed track representing the likelihood of a moving object of correct identity actually being within the tracking window; and
- the taking into account, by the filter, of all possible associations of signals coming from different sensors and the most refined evaluation of their likelihood for the tracking being processed, to the benefit of the precision of location, the stability of the filter and the management of the ambiguities of associations between resolution cells of nonaligned sensors.

In the present description, the word "sensor" is associated with the fact of delivering a set of measurement signals $(M_j^{1h})$. In practice, it is not impossible for a single physical sensor to deliver several sets of such signals. It then constitutes several sensors, within the meaning of the present invention.

Reference has been made throughout the description to the use of a PDAF-type filter. Tracking filters using Bayesian methods can also be used, in particular the variants of the PDAF known to experts (JPDAF, JPDAM etc), together with their use in interactive multimode concepts (IMM).

The learning of the function pairs $(F_i(M_j^{1h}), D_{ij}^{1h})$ can correspond to the storage in memory, once and for all, of data corresponding to the sensors concerned. It can also be a developing process, that is to say one enhanced as experience is acquired.

In addition, two cases (Case 1 and Case 2) have been given above, for the application of the theory of evidence. These cases are currently considered by the Applicant to be the only two optimum cases that can be derived from the theory of evidence. The present invention is not strictly limited to these two cases, since experts may determine other, suboptimum, forms which might be suitable, at least for certain specific applications.

I claim:

1. A method for tracking the trajectory of moving objects, of the type in which:

a) one or more sensors $(S_j^1)$ are provided, which deliver signals $(M_j^{1h})$ relating to the presence of at least one moving object, with reference to a known division of space, peculiar to each group of sensors, in so-called spatial resolution cells $(X^{1h})$;

b) by means of logic tests peculiar to each sensor, some of these signals $(M_j^{1h})$ are selected in accordance with a chosen windowing criterion, relating to the resolution cells $(X^{1h})$;

c) an estimate is worked out of the probability ($\beta k$) that a moving body has of being in a cell (Xk) which is the intersection of the resolution cells $(X^{1h})$ peculiar to each sensor $(S_j^1)$, according to the signals selected at b), and trajectory tracking data ($\alpha k$);

d) this probability (pk) is applied to an adaptive tracking filter (4), the output of this filter (4) supplying an estimated status (X*,P*) and affording a trajectory prediction (x,S) for at least one moving object; and e) the chosen windowing criterion is adjusted according to this trajectory prediction (x,S), step c) comprising:

c1) the prior storage in memory of n sets of J distribution functions $F_i(M_j^{1h})$, these n sets relating respectively to n identities $H_i$ of indexed moving objects (i=1 to n; j=1 to J, each of these functions $(F_i(M_j^{1h})$ representing the a priori probability $(P(M_j^{1h}/H_i))$ of observing the measurement $(M_j^{1h})$ in the resolution cell $(X^{1h})$ of the sensor $(S_j^1)$ when a moving object of identity $(H_i)$ is presented to this sensor, and having a coefficient $(D_{ij}^{1h})$ representing the degree of confidence given thereto;

c2) the determination, from each measurement $(M_j^{1h})$ and the pairs $(F_i(M_j^{1h}), D_{ij}^{1h})$ stored in memories, of orders of likelihood $(A_{ij}^{1h}, B_{ij}^{1h})$, and this for all the identities $(H_i)$ indexed, where $A_{ij}^{1h}$ represents the likelihood ratio between the cases "there is a moving object of identity $H_i$ in cell $X^{1h}$" and "no moving object of identity $H_i$ is present in the cell $X^{1h}$", whilst $B_{ij}^{1h}$ represents an uncertainty factor for $A_{ij}^{1h}$;

c3) the merging, for each resolution cell $(X^{1h})$ and each identity of moving objects $(H_i)$, of these pairs of orders of likelihood $(A_{ij}^{1h}, B_{ij}^{1h})$ obtained for all the sensors $(S_j^1)$ in the same alignment group, into a single pair of likelihood $(A_i^{1h}, B_i^{1h})$;

c4) the calculation, from the likelihoods $(A_i^{1h}, B_i^{1h})$ relating to a first resolution cell $(X^{1h})$, of the likelihood $(Q^{1h})$ for there being in this cell $(X^{1h})$ a moving object of the same identity as the moving object being tracked;

c5) the calculation, from the likelihoods $(Q^{1h})$ of each group of sensors, for each cell (Xk), the intersection of the resolution cells $(X^{1h})$ in question, of the likelihood (Qk) of there being in this box (Xk) a moving object of the same identity as the moving object being tracked; and c6) the calculation, from the values (Qk) and tracking coefficients ($\alpha k$) delivered by the adaptive tracking filter (4a), for each cell (Xk), of the a posteriori probability ($\beta K$) that the moving body being tracked is in this cell (Xk).

2. The method as claimed in claim 1, wherein the filtering effected by the adaptive tracking filter (4) is a Kalman filtering, of the "PDAF" type.

3. The method as claimed in claim 1, wherein the sensors $(S_j^1)$ are distributed in so-called "alignment" groups of the same index (1), for each of which the division into spatial cells $(X^{1h})$ is the same, step c) is performed separately within each group of sensors of the same index (1), and then a merge is effected between the measurements coming from the different groups of sensors of 1 in order to determine, from the likelihoods $Q^{1h}$ peculiar to each group, a likelihood Qk, strictly of the same type, relating to a resolution cell Xk which is the intersection of the cells $X^{1h}$ in question, for all the cells Xk contained in the validation window, and step d) is performed for each box Xk contained in the validation window.

4. The method as claimed in claim 3, wherein the filtering effected by the adaptive tracking filter (4) is a Kalman filtering, of the "PDAF" type.

5. A method as claimed in claim 1, wherein step d) takes into account the probability of the object ($\beta k$) being in a given cell Xk, and the probability ($\beta 0$) of its being outside the validation window.

6. The method as claimed in claim 1, wherein the distribution functions ($F_i(M_j^{1h})$) and the confidence coefficients ($D_{ij}^{1h}$) associated therewith result from a prior supervised statistical learning, and the n times J pairs ($F_i(M_j^{1h})$, $D_{ij}^{1h}$) correspond to particular observation conditions which are a function of the weather, time, seasons, observation geometry, type of environment and physical characterisation of the moving objects.

7. The method as claimed in claim 6, wherein the n times J pairs ($F_i(M_j^{1h})$, $D_{ij}^{1h}$) corresponding to each particular condition are stored in memories (1) peculiar to one and only one particular condition.

8. The method as claimed in claim 6, wherein the nominal operating observation conditions are identified, for each sensor ($S_j^1$), by a calculation unit, which accordingly selects the memories (1) in which the corresponding pairs ($F_i(M_j^{1h})$, $D_{ij}^{1h}$ are stored.

9. The method as claimed in claim 7, wherein the nominal operating observation conditions are identified, for each sensor ($S_j^1$), by a calculation unit, which accordingly selects the memories (1) in which the corresponding pairs ($F_i(M_j^{1h})$ are stored.

10. The method as claimed in claim 1, wherein a preliminary processing by a first logic unit (2b) comprises the establishment of a threshold for each signal coming from each sensor ($S_j^1$) in order to eliminate the measurements which are not liable to correspond to an object.

11. The method according to claim 1, wherein the orders of likelihood ($A_{ij}^{1h}$) and ($B_{ij}^{1h}$) are calculated by means of expressions derived from the theory of evidence, by virtue of optimality criteria.

12. A device for tracking the trajectory of a moving object, comprising:

a) one or more sensors ($S_i^1$), suitable for delivering signals ($M_j^{1h}$) relating to the presence of at least one moving object, with reference to a known division of space, suited to each group of sensors, into spatial resolution cells ($X^{1h}$);

b) memories (1), suitable for storing distribution functions ($F_i(M_j^{1h})$), and confidence coefficients ($D_{ij}^{1h}$) associated with each of the distribution functions ($F_i(M_j^{1h})$), the step of storing comprising the prior storage in memory of n sets of J distribution functions $F_i(M_j^{1h})$, these n sets relating respectively to n identities $H_i$ of indexed moving objects (where i=1 to n and j=1 to J, for each of the functions ($F_i(M_j^{1h})$) representing a priori probability ($P(M_j^{1h}/H_i)$) of observing the measurement ($M_j^{1h}$) in the resolution cell ($X^{1h}$) of the sensor ($S_j^1$) when a moving object of identity ($H_i$) is presented to this sensor, and having a coefficient ($D_{ij}^{1h}$) representing the degree of confidence given thereto;

c) a local processing unit (2) suitable for evaluating, from each measurement ($M_{j1h}$) and using the pairs ($F_i(M_j^{1h})$, $D_{ij}^{1h}$) contained in the memories (1), the likelihood of there being a moving object of given identity in the resolution cell ($X^{1h}$) of the sensor ($S_j^1$), and this for all the identities indexed a priori ($H_i$) for the memories (1);

d) a merge unit (3), suitable for merging the likelihoods delivered by the local processing unit (2), and for producing a second likelihood for the location of the moving object being tracked on the basis of the observations made at the current time; and e) a tracking filter (4), suitable for calculating, from the information produced by the above units (2 and 3), the estimated status of the moving object which is the subject of the trajectory monitoring.

13. The device as claimed in claim 12, wherein the local processing unit (2) also comprises:

a calculation unit, suitable for identifying the observation conditions making it possible to select the memories (1) which contain the most suitable pairs ($F_i(M_j^{1h})$, $D_{ij}^{1h}$)λ from the measurements ($M_j^{1h}$) and external information; and a logic unit, suitable for limiting the number of boxes (Xk) to be processed.

14. The device as claimed in claim 13, characterised in that the merge unit (3) comprises:

a) a first group of multipliers (3a), suitable for merging the likelihoods ($A_{ij}^{1h}$, $B_{ij}^{1h}$) supplied by the calculation unit (2a) into a single likelihood ($A_i^{1h}$, $B_i^{1h}$) strictly of the same type;

b) secondary calculation units (3b), suitable for producing, from the likelihoods ($A_i^{1h}$, $B_i^{1h}$) delivered by the multipliers (3a) common to a single group of sensors ($S_j^1$), the likelihood ($Q^{1h}$) for there being, in the resolution box ($X^{1h}$), a moving object of the same identity as the moving object being tracked;

c) a second logic unit (3c), suitable for determining, by logic tests suited to the nature of the sensors in question, the associations of resolution boxes ($X^{1h}$) between the aligned sensor groups, whose intersection (Xk) is within the validation window;

d) a second multiplier (3d), suitable for determining a likelihood (Qk), from the different likelihoods ($Q^{1h}$), relating to a resolution box (Xk) which is the intersection of the boxes ($X^{1h}$) in question; and e) a third calculation unit (3e), suitable for supplying, from all the likelihoods (Qk) and tracking coefficients ($\alpha k$) delivered by the tracking filter (4), a quantity ($\alpha k$) representing the a posteriori probability that the moving object being tracked has of being in this box (Xk).

15. The device as claimed in claim 12, wherein the tracking filter (4) is a Kalman filter of the PDAF type.

16. A method for tracking the trajectory of moving objects comprising the steps of:

detecting signals from at least one sensor arranged in groups relating to the presence of a moving object in a plurality of spatial resolution cells;

selecting said detected signals in accordance with a chosen windowing criterion relating to said plurality of resolution cells;

estimating the probability that a detected signal in a final resolution cell comprising the intersection of said plurality of resolution cells of each group has the same identity as one of said moving objects being tracked according to said detected signal and trajectory tracking data, said step of estimating further comprising the step of:

storing in memory trajectory tracking data comprising distribution functions representing a priori probability that a detected signal in said plurality of resolution cells has the same identity as one of said moving objects being tracked, and a confidence coefficient representing the degree of confidence given thereto;

determining a first order of likelihood that a detected signal in said plurality of resolution cells has the same identity as one of said moving objects being tracked, and determining a second order of likelihood representing an uncertainty factor of said first order of likelihood, said first and second order likelihoods being based on said detected signal, said distribution function, and said confidence coefficient, merging for each of said plurality of resolution cells said first and second order of likelihood into a single first and second order of likelihood for each group, calculating from said single first and second order of likelihoods for each group a probability that a detected signal in said plurality of resolution cells has the same identity as one of said moving objects being tracked, calculating from each of said probabilities a final likelihood that a detected signal in said final resolution cell has the same identity as one of said moving objects being tracked, and calculating from each of said final likelihoods and said trajectory tracking data for each of said final resolution cells a posteriori probability that a detected signal has the same identity as one of said moving objects being tracked;

generating an estimated status and trajectory prediction based on said estimated probability for said moving objects being tracked; and adjusting said windowing criterion in accordance with said trajectory prediction.

17. The method as claimed in claim 16 wherein the step of generating an estimated status and a trajectory prediction is performed with a "PDAF" type Kalman filter.

18. The method as claimed in claim 16 wherein each of said at least one sensor are aligned with those in its respective groups, wherein said step of estimating the probability is performed separately within each said group, and then a merge is effected between the estimates from said different groups for determine a likelihood that a detected signal in a final resolution cell has the same identity as one of said moving targets being tracked for all final resolution cells in said validation window, and wherein the step of generating an estimated status and a trajectory prediction is performed for each of said final resolution cells in said validation window.

19. The method as claimed in claim 18 wherein the step of generating an estimated status and a trajectory prediction is performed with a "PDAF" type Kalman filter.

20. A method as claimed in claim 16 wherein the step of generating an estimated status and a trajectory prediction takes into account the estimated probabilities that one of said moving targets being tracked is in a final resolution cell, and that said one of said moving targets being tracked is outside the validation window.

21. The method as claimed in claim 16 wherein said distribution functions and said confidence coefficients are generated from a prior supervised statistical learning corresponding to particular observation conditions which are a function of the weather, time, seasons, observation geometry, type of environment and physical characterization of said moving objects being tracked.

22. The method as claimed in claim 21 wherein said distribution functions and said confidence coefficients corresponding to each of said particular conditions are stored in memory.

23. The method as claimed in claim 21 wherein nominal operating observation conditions are identified for each of said at least one sensor by a calculation unit which accordingly selects the memory in which said corresponding distribution functions and confidence coefficients are stored.

24. The method as claimed in claim 22 wherein nominal operating observation conditions are identified for each of said at least one sensor by a calculation unit which accordingly selects the memory in which said corresponding distribution functions and confidence coefficients are stored.

25. The method as claimed in claim 16 further comprising the step of establishing a threshold for each detected signal from said at least one sensor for eliminating detected signals that are unlikely to correspond to a target.

26. The method according to claim 16 wherein said first and second order of likelihood are calculated by means of expressions derived from a theory of evidence by virtue of optimality criteria.

27. A device for tracking the trajectory of moving objects comprising:

at least one sensor arranged in groups for detecting signals indicating the presence of a moving object with reference to a plurality of resolution cells;

a memory for storing trajectory tracking data comprising distribution functions representing a priori probability that a detected signal in said plurality of resolution cells has the same identity as one of said moving objects being tracked, and a confidence coefficient representing the degree of confidence given thereto, said distribution function being generated from previous detected signals;

a local processing unit for determining the likelihood in each of said sensor groups that a detected signal in said plurality of resolution cells has the same identity as one of said moving objects being tracked, said likelihood being based on said detected signal from said at least one sensor and said distribution functions and confidence coefficients from said memory;

a merge unit for merging the likelihoods of each of said sensor groups and producing therefrom a second likelihood that said detected signal in said plurality of resolution cells has the same identity as one of said moving objects being tracked, said second likelihood being based on said detected signal from said at least one sensor; and a tracking filter for calculating the estimated status of said moving objects being tracked from the likelihood from said local processor and the second likelihood from said merge unit.

28. The device as claimed in claim 27 wherein the local processing unit comprises:

a calculation unit for identifying said observation conditions allowing the selection of memory which contain the most suitable distribution functions and confidence coefficients for each of said moving targets being tracked; and a logic unit for limiting the number of said plurality of resolution cells to be processed.

29. The device as claimed in claim 28 wherein the merge unit comprises:

first multipliers for merging the likelihoods from said local processing unit into a single first and second likelihood for each group;

secondary calculation units for producing from said first and second likelihoods a third likelihood that a detected signal in said plurality of resolution cells has the same identity as one of said moving objects being tracked;

a second logic unit for determining an intersection of said plurality of resolution cells between the groups within a validation window;

a second multiplier for determining a fourth likelihood from said third likelihood that a detected signal in said intersection of said plurality of resolution cells has the same identity as one of said moving objects being tracked; and a third calculation unit for generating a posteriori probability that a detected signal in said intersection of said plurality of resolution cells has the same identity as one of said moving objects being tracked from said fourth likelihood from tracking coefficients from said tracking filter.

30. The device as claimed in claim 27 wherein said tracking filter is a PDAF type Kalman filter.

* * * * *

UNITED STATES PATENT AND TRADEMARK OFFICE
CERTIFICATE OF CORRECTION

PATENT NO. : 5,537,118
DATED : July 16, 1996
INVENTOR(S) : Alain Appriou

It is certified that error appears in the above-indentified patent and that said Letters Patent is hereby corrected as shown below:

Column 2, line 33, change "$F_i(M^j{}_1h)$" and insert therefor -- $F_i(M_j{}^{1h})$ --.
Column 2, line 35, change "$Mj^{2h}$" to -- $M_j{}^{1h}$ --.
Column 2, line 64, change "BK" to -- ßK --.
Column 3, line 50, change "countermeasure" to -- countermeasures --.
Column 4, line 59, change "cell" to -- cells --.
Column 5, line 17, before "Xk" insert an additional space.
Column 7, line 40, change the equation to read:
 -- $B_{ij}{}^{1h} = (1-D_{ij}{}^{1h})^{*}[1+R_j{}^{1h*}F_i(M_j{}^{1h})]/C_{ij}{}^{ih}$ --.
Column 8, line 30, in the equation change "$B_i{}^{ih}$" (first occurrence) to -- $B_i{}^{1h}$ --.
Column 9, line 67, change the equation to read:
 $P^{*} = \beta 0^{*}P0 + (1-\beta 0)^{*}(^{1}-G^{*}H)^{*}P^{0}+P'$
Column 12, line 51, change "box" to -- cell --.
Column 13, line 8, change "box" to -- cell --.
Column 13, line 50, change "$S_i{}^{1}$" to -- $S_j{}^{1}$ --.
Column 14, line 2, change "$M_{j1h}$" to -- $M_j{}^{1h}$ --.
Column 14, line 20, after "$D_{ij}{}^{1h}$)" delete "λ".
Column 14, line 23, change "boxes" to -- cells --.
Column 14, line 36, change "box" to -- cell --.
Column 14, line 40, change "boxes" to -- cells --.
Column 14, line 45, change "box" to -- cell --.
Column 14, line 46, change "boxes" to -- cells --.

UNITED STATES PATENT AND TRADEMARK OFFICE
CERTIFICATE OF CORRECTION

PATENT NO. : 5,537,118
DATED : July 16, 1996
INVENTOR(S) : Alain Appriou

It is certified that error appears in the above-indentified patent and that said Letters Patent is hereby corrected as shown below:

Column 14, line 49, change "($\alpha$k)" to -- ($\beta$k) --
Column 14, line 51, change "box" to -- cell --.
Column 15, line 47, change "determine" to -- determining --.

Signed and Sealed this

Thirtieth Day of December, 1997

*Attest:*

BRUCE LEHMAN

*Attesting Officer*      *Commissioner of Patents and Trademarks*